(12) United States Patent
Kawakubo

(10) Patent No.: US 7,236,194 B2
(45) Date of Patent: Jun. 26, 2007

(54) IMAGE SIGNAL PROCESSING APPARATUS

(75) Inventor: Takuji Kawakubo, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 883 days.

(21) Appl. No.: 10/653,726

(22) Filed: Sep. 2, 2003

(65) Prior Publication Data

US 2004/0046880 A1    Mar. 11, 2004

(30) Foreign Application Priority Data

Sep. 5, 2002    (JP)    ............................ 2002-259532

(51) Int. Cl.
| | |
|---|---|
| H04N 3/14 | (2006.01) |
| H04N 5/225 | (2006.01) |
| H04N 5/228 | (2006.01) |
| H04N 5/76 | (2006.01) |

(52) U.S. Cl. ................ 348/272; 348/220.1; 348/222.1; 348/231.6

(58) Field of Classification Search ...................... None
See application file for complete search history.

(56) References Cited

U.S. PATENT DOCUMENTS

| | | | | |
|---|---|---|---|---|
| 5,712,680 | A * | 1/1998 | Hieda | 348/220.1 |
| 6,377,301 | B1 * | 4/2002 | Hieda | 348/222.1 |
| 6,697,106 | B1 * | 2/2004 | Saito | 348/222.1 |
| 6,801,250 | B1 * | 10/2004 | Miyashita | 348/220.1 |
| 6,809,770 | B1 * | 10/2004 | Ide | 348/312 |
| 2002/0081104 | A1 * | 6/2002 | Shimizu | 348/220.1 |

FOREIGN PATENT DOCUMENTS

JP    2001-231003    8/2001

* cited by examiner

*Primary Examiner*—David Ometz
*Assistant Examiner*—Luong T. Nguyen
(74) *Attorney, Agent, or Firm*—Gerald T. Bodner

(57) ABSTRACT

An image signal processing apparatus includes a line separation circuit. When interpolated image data is generated based on low resolution raw image data having color information distributed on a pixel of each line in the order of R, G, G, B, . . . , firstly, the line separation circuit converts a color distributing manner using two line memories. As a result of a conversion, the color information is distributed on the pixel of an odd number line in the order of R, G, R, G, . . . , and the color information is distributed on the pixel of an even number line in the order of G, B, G, B, . . . . Such a color separation toward the low resolution raw image data is performed using three line memories. On the other hand, when the interpolated image data is generated based on high resolution raw image data having the color information distributed on the pixel of the odd number line in the order of R, G, R, G, . . . , and the color information distributed on the pixel of the even number line in the order of G, B, G, B, . . . , the conversion of the color distribution is not performed, and the color separation is executed using all of the five line memories.

8 Claims, 8 Drawing Sheets

| 30 |
|---|
| DISPLAY IMAGE AREA (YUV) — 30a |
| RAW IMAGE AREA (RAW) — 30b |
| JPEG WORK AREA (YUV) — 30c |
| COMPRESSED IMAGE AREA (YUV) — 30d |

| | 1 | 2 | 3 | 4 | 5 | 6 | 7 | 8 | 9 | 10 | |
|---|---|---|---|---|---|---|---|---|---|---|---|
| 10 | G | B | G | B | G | B | G | B | G | B | ... |
| 9 | R | G | R | G | R | G | R | G | R | G | ... |
| 8 | G | B | G | B | G | B | G | B | G | B | ... |
| 7 | R | G | R | G | R | G | R | G | R | G | ... |
| 6 | G | B | G | B | G | B | G | B | G | B | ... |
| 5 | R | G | R | G | R | G | R | G | R | G | ... |
| 4 | G | B | G | B | G | B | G | B | G | B | ... |
| 3 | R | G | R | G | R | G | R | G | R | G | ... |
| 2 | G | B | G | B | G | B | G | B | G | B | ... |
| 1 | R | G | R | G | R | G | R | G | R | G | ... |

(B)

| $R_{7-1}$ | $G_{7-2}$ | $R_{7-3}$ | $G_{7-4}$ | $R_{7-5}$ | $G_{7-6}$ | $R_{7-7}$ | $G_{7-8}$ | $R_{7-9}$ | $G_{7-10}$ | ... |
|---|---|---|---|---|---|---|---|---|---|---|
| $R_{5-1}$ | $G_{5-2}$ | $R_{5-3}$ | $G_{5-4}$ | $R_{5-5}$ | $G_{5-6}$ | $R_{5-7}$ | $G_{5-8}$ | $R_{5-9}$ | $G_{5-10}$ | ... |
| $R_{3-1}$ | $G_{3-2}$ | $R_{3-3}$ | $G_{3-4}$ | $R_{3-5}$ | $G_{3-6}$ | $R_{3-7}$ | $G_{3-8}$ | $R_{3-9}$ | $G_{3-10}$ | ... |
| $R_{1-1}$ | $G_{1-2}$ | $R_{1-3}$ | $G_{1-4}$ | $R_{1-5}$ | $G_{1-6}$ | $R_{1-7}$ | $G_{1-8}$ | $R_{1-9}$ | $G_{1-10}$ | ... |

(C)

| $G_{8-1}$ | $B_{8-2}$ | $G_{8-3}$ | $B_{8-4}$ | $G_{8-5}$ | $B_{8-6}$ | $G_{8-7}$ | $B_{8-8}$ | $G_{8-9}$ | $B_{8-10}$ | ... |
|---|---|---|---|---|---|---|---|---|---|---|
| $G_{6-1}$ | $B_{6-2}$ | $G_{6-3}$ | $B_{6-4}$ | $G_{6-5}$ | $B_{6-6}$ | $G_{6-7}$ | $B_{6-8}$ | $G_{6-9}$ | $B_{6-10}$ | ... |
| $G_{4-1}$ | $B_{4-2}$ | $G_{4-3}$ | $B_{4-4}$ | $G_{4-5}$ | $B_{4-6}$ | $G_{4-7}$ | $B_{4-8}$ | $G_{4-9}$ | $B_{4-10}$ | ... |
| $G_{2-1}$ | $B_{2-2}$ | $G_{2-3}$ | $B_{2-4}$ | $G_{2-5}$ | $B_{2-6}$ | $G_{2-7}$ | $B_{2-8}$ | $G_{2-9}$ | $B_{2-10}$ | ... |

FIG. 8
(A) OUTPUT OF SW1
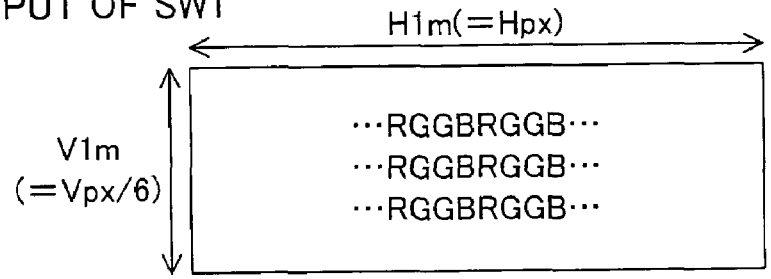
(B) OUTPUT OF LINE SEPARATION CIRCUIT
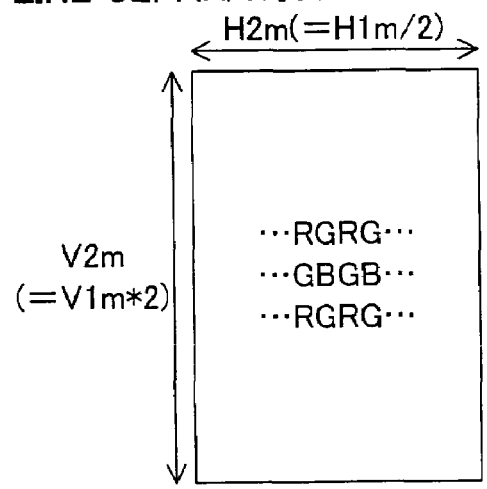
(C) OUTPUT OF YUV CONVERSION CIRCUIT
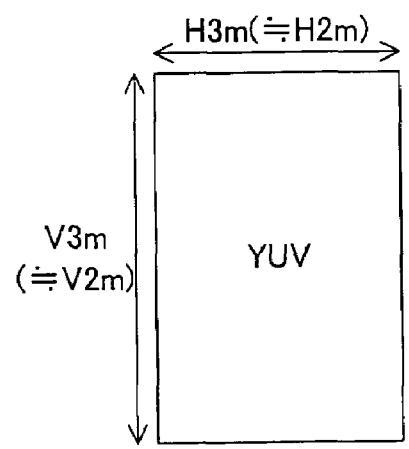

FIG. 9
(A) OUTPUT OF SW1
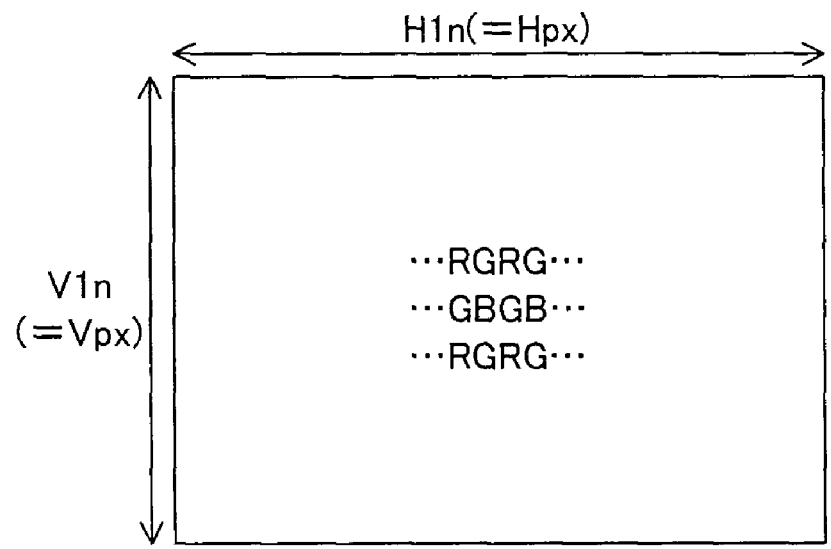
(B) OUTPUT OF YUV CONVERSION CIRCUIT
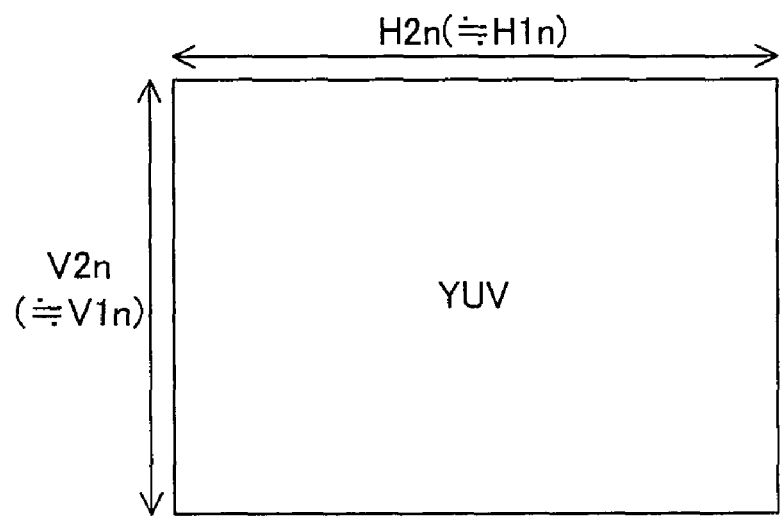

IMAGE SIGNAL PROCESSING APPARATUS

BACKGROUND OF THE INVENTION

1. Field of the Invention

The present invention relates to an image signal processing apparatus. More specifically, the present invention relates to an image signal processing apparatus applied to a video camera, and applying a signal process to an image signal to which a plurality of colors of color information is assigned at the rate of one color to one pixel.

2. Description of the Prior Art

An example of such the kind of a conventional video camera is disclosed in Japanese Patent laying-open No. 2001-231003 laid-open on Aug. 24, 2001. According to the prior art, before a shutter button is operated, a CCD imager is driven in a thinning-out reading manner, and a raw image signal of a low resolution read out from the CCD imager is converted into an image signal in a YUV format. As a result, a real time moving image based on the converted image signal is displayed on a monitor. If the shutter button is operated, the CCD imager is driven in an all-pixel-reading manner, the raw image signal of a high resolution read out from the CCD imager is converted into the image signal in the YUV format, and the converted image signal is recorded into a recording medium in a compressed state.

In the prior art, a distributing manner of color information included in the raw image signal output from the CCD imager is always constant before/after the shutter button is operated. That is, in either of the raw image signal of the low resolution read out before the shutter button is operated or the raw image signal of the high resolution read out after the shutter button is operated, a line of Cy, Ye, . . . , and a line of Mg, G, . . . are alternately included in the vertical direction. Thus, irrespective of an operation of the shutter button, it is possible to convert the raw image signal into the image signal in the YUV format by a common signal process. However, this means that in a case that the distributing manner of the color information included in the raw image signal is changed before/after the shutter button is operated, the signal process (color separating process, in particular) is not executed.

SUMMARY OF THE INVENTION

Therefore, it is primary object of the present invention to provide an image signal processing apparatus capable of applying a color separating process to image signals having different color distributing manners with each other.

An image signal processing apparatus according to the present invention is an image signal processing apparatus provided with K of line memories, and applying a signal process to a first image signal having a plurality of colors of color information in which one color is assigned to one pixel in a first manner, and a second image signal having a plurality of colors of color information in which one color is assigned to one pixel in a second manner, and comprises: a converter for converting a color distribution of the first image signal from the first manner to the second manner using L of line memories forming K of line memories; a first color separator for applying a color distribution to the first image signal having the color separation converted by the converter using M (=K−L) of line memories forming K of line memories; and a second color separator for applying a color separation to the second image signal using K of line memories.

Regarding a first image signal having a plurality of colors of color information in which one pixel is assigned to one pixel in a first manner, firstly, a converter converts a color distribution from a first manner to a second manner using L of line memories forming K of line memories. The first image signal having the color distribution converted is subjected to a color separation by a first color separator using M (=K−L) of line memories forming K of line memories. On the other hand, regarding a second image signal having a plurality of colors of color information in which one color is assigned to one pixel in a second manner, the color separation is applied to the second image signal using K of line memories.

That is, when a signal process is applied to the first image signal, a portion of the line memories is used for converting a color distributing manner, and the remaining line memories are used for the color separation. On the other hand, when the signal process is applied to the second image signal, all line memories are used for the color separation. The number of the line memories assigned for the color separation differs depending on the first image signal and the second image signal, a difference in performance of the color separation, however, a color separating process becomes possible toward the image signal having a different color distributing manner.

Preferably, the first manner is a manner in which the plurality of colors of color information are distributed across N (≦L) lines, and the second manner is a manner in which the plurality of colors of color information are distributed across the L lines. In such the case, it is possible to convert the color distribution from the first manner to the second manner by using L of line memories.

Preferably, the first color separator generates by each one line an interpolated image signal formed of each pixel having the plurality of colors of color information based on the first image signal read out from the L of line memories.

On the other hand, the second color separator simultaneously generates a plurality of lines of an interpolated image signal formed of each pixel having the plurality of colors of color information based on the second image signal read out from K of line memories, and generates one line of the interpolated image signal having a noise removed based on the plurality of lines of the generated interpolated image signal.

Preferably, the first image signal has a resolution lower than that of the second image signal. In view of the fact that a low resolution image signal does not require a high quality image, M of the line memories, which are smaller than K, is used for the color separation of the first image signal. Further preferably, the first image signal is a moving image signal, and the second image signal is a still image signal. This is due to the fact that the still image of each frame forming the moving image does not require the high quality image.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a timing chart showing one portion of an operation of a CCD imager when a thinning-out reading is performed;

FIG. 6 is an illustrative view showing one portion of an operation of the CCD imager when all-pixel reading is performed;

FIG. 8 is an illustrative view showing one portion of an operation of FIG. 1 embodiment when a through image displaying process is performed; and FIG. 9 is an illustrative view showing one portion of an operation of FIG. 1 embodiment when a recording process is performed.

DETAILED DESCRIPTION OF THE PREFERRED EMBODIMENTS

Figure 1:
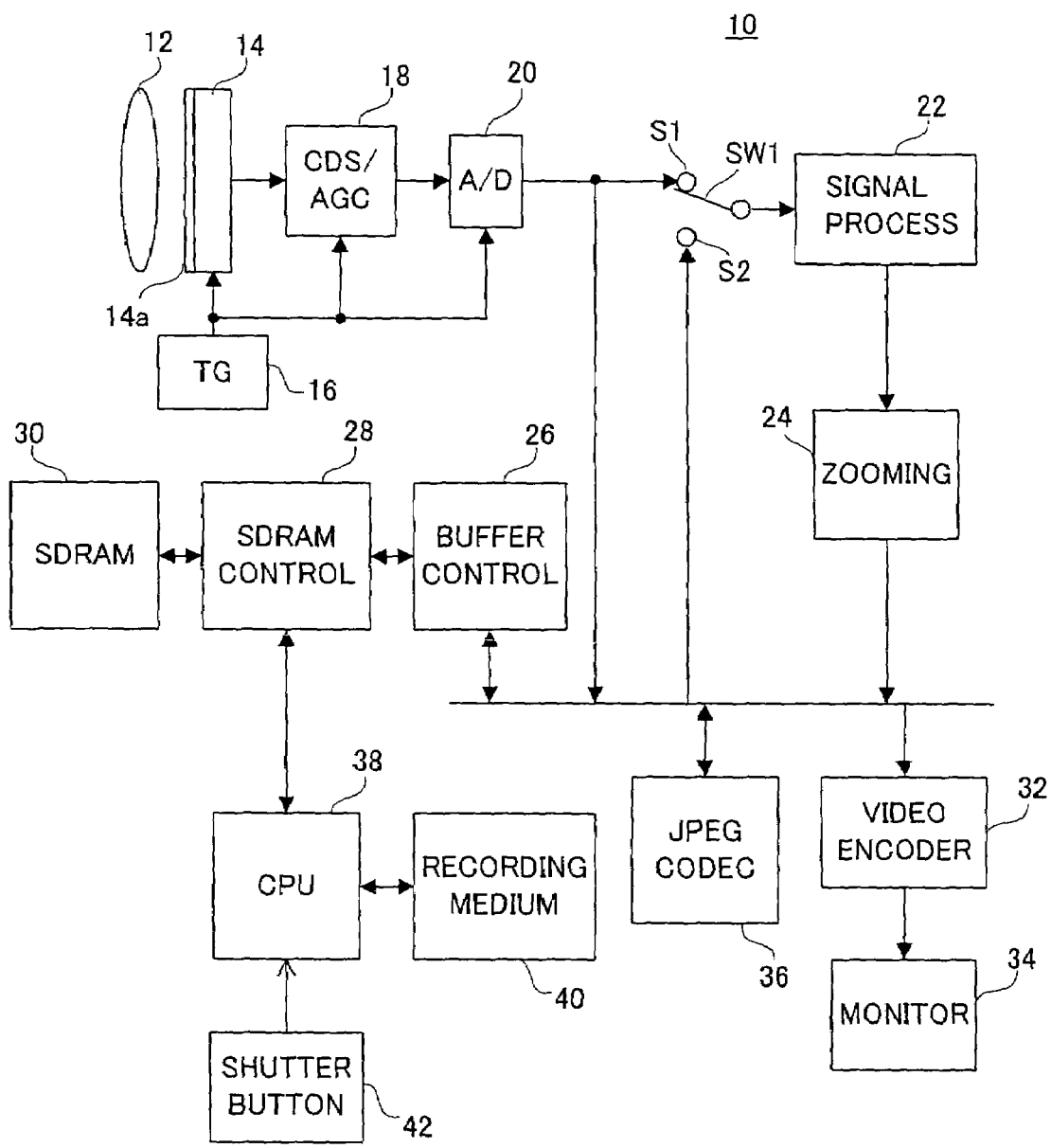
FIG. 1 is a block diagram showing one embodiment of the present invention.

Referring to FIG. 1, a digital camera 10 of this embodiment includes a CCD imager 14 adopting an interline transfer scheme. A light-receiving surface of the CCD imager 14 is covered with a color filter 14a, and an optical image of an object is radiated onto the light-receiving surface of the CCD imager 14 via an optical lens 12 and the color filter 14a.

Figures 2, 3:
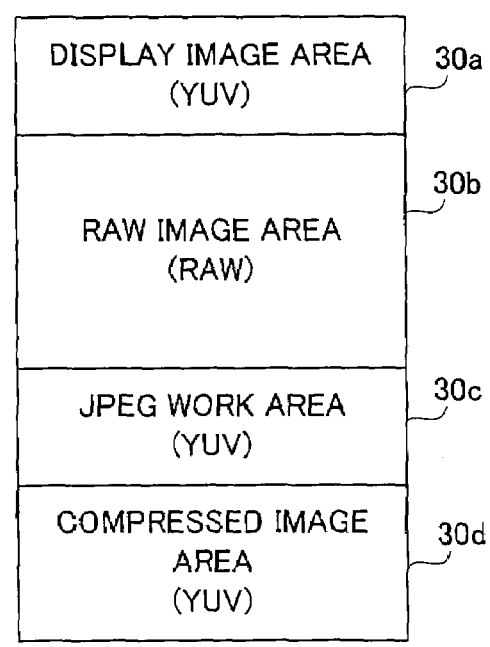
FIG. 2 is an illustrative view showing one example of a color filter applicable to FIG. 1 embodiment.
FIG. 3 is an illustrative view showing one example of a mapping state of an SDRAM applicable to FIG. 1 embodiment.

Referring to FIG. 2, the color filter 14a is a primary color filter in which a color element in red (R element), the color element in green (G element), and the color element in blue (B element) are arranged in a mosaic manner. In the vertical direction, an RG line in which the R element and the G element are alternately arranged in the horizontal direction, and a GB line in which the G element and the B element are alternately arranged in the horizontal direction are alternately arranged. Such the color elements correspond to light-receiving elements, that is, pixels, formed on the light-receiving surface of the CCD imager 14 at a ratio of one color to one pixel, and an electric charge, that is, a pixel signal, generated in each light-receiving element by a photoelectric conversion has color information of R, G, or B.

When a power is input, a CPU 38 instructs a TG (Timing Generator) 16 to repeat an exposure and a thin-out reading for displaying a real time moving image (through image) of the object on an LCD monitor 34. The TG 16 applies the exposure to the image sensor 14 in response to a vertical synchronizing signal, and reads out the electric charges generated by the light-receiving elements based on the exposure in a thinning-out manner. In the thinning-out reading, the pixel shown by diagonal lines in FIG. 5(A) becomes a subject to be read out, and the electric charge generated by such the pixel is output from the CCD imager 14 as shown in FIG. 5(B)-FIG. 5(F).

Figure 5:
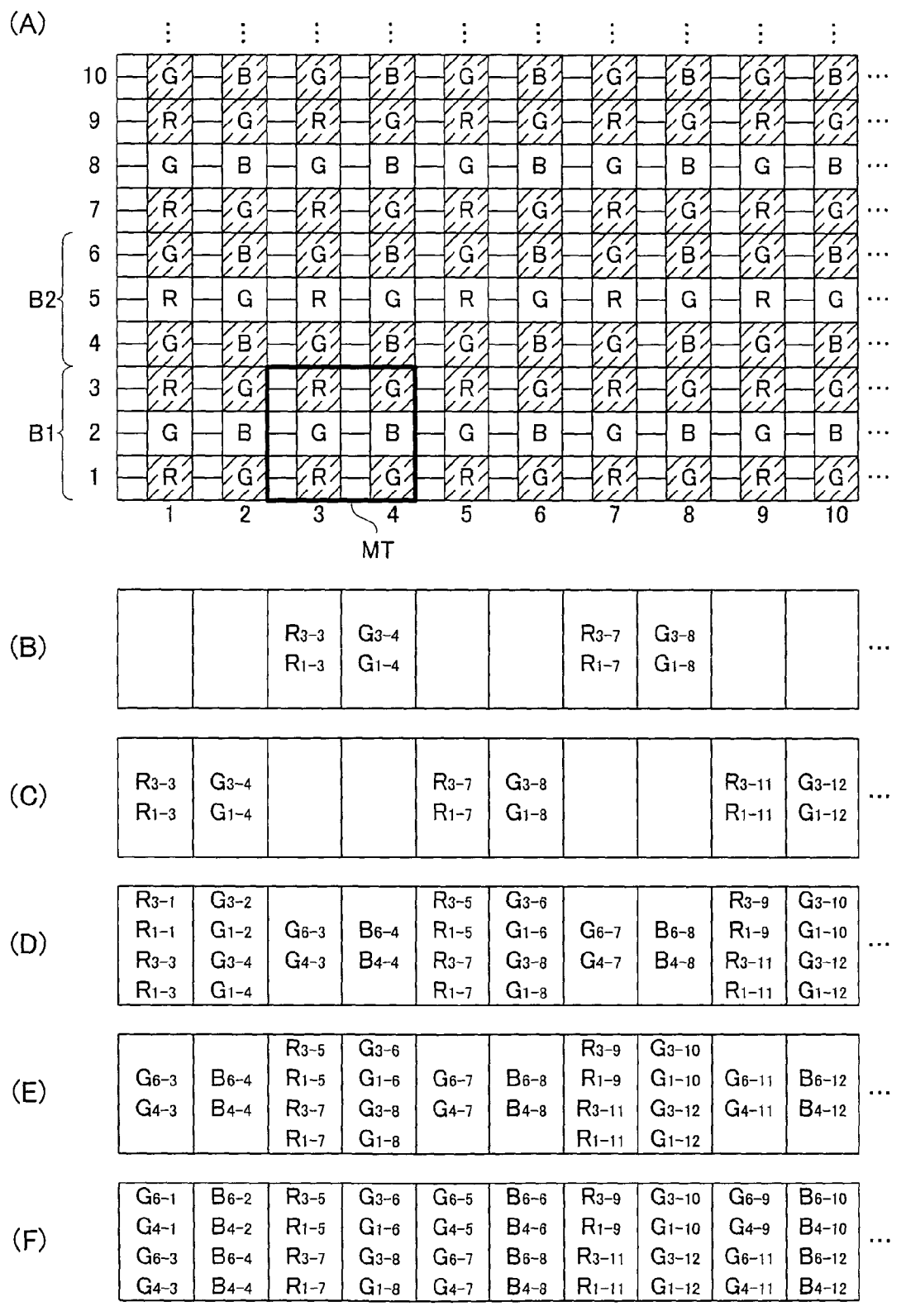

Referring to FIG. 5(A), in three lines having the RG line, the GB line, and the RG line continued in this order in the vertical direction, which is a belt B1, the two RG lines become a reading-out line, and in three lines having the GB line, the RG line, and the GB line continued in this order in the vertical direction, which is a belt B2, the two GB lines become the reading-out line.

Provided that each of the belts B1 and B2 is a unit of a matrix MT of the vertical three lines×the horizontal two pixels, firstly, the electric charges generated by the matrix MT of the even number-th in the belt B1 are read out at a timing shown in FIG. 5(b), and the electric charges having the same color information are mixed with each other. The mixed electric charges are transferred in the horizontal direction as shown in FIG. 5(C), and mixed with the electric charges read out from the matrix MT of the odd number-th in the belt B1 at a timing shown in FIG. 5(D). Thus, the electric charges equal to four pixels having the same color information are brought together as one.

The electric charges generated by the matrix MT of the even number-th in the belt B2 are read out at a timing shown in FIG. 5(D), and the electric charges having the same color information are mixed with each other. The mixed electric charges are transferred in the horizontal direction as shown in FIG. 5(E), and mixed with the electric charges read out from the matrix MT of the odd number-th in the belt B2 at a timing shown in FIG. 5(F). Thus, regarding the belt B2, too, the electric charges equal to four pixels having the same color information are also brought together as one.

As a result of a reading-out/transfer of the pixel signal being executed as described above, the low resolution raw image signal having the resolution lowered is output from the CCD imager 14. The low resolution raw image signal output from the CCD imager 14 is subjected to a noise removal and a level adjustment by a CDS/AGC circuit 18, and converted into digital data (low resolution raw image data) by the A/D converter 20. When the through image is displayed on the monitor 34, the CPU 38 connects a switch SW1 to a terminal S1. Therefore, the low resolution raw image data output from the A/D converter 20 is applied to the signal processing circuit 22 via the switch SW1, and converted into low resolution YUV data by a signal process corresponding to a through image display. The low resolution YUV data output from the signal processing circuit 22 is applied to the buffer control circuit 26 via a reduction zooming process by a zooming circuit 24.

Figure 4:
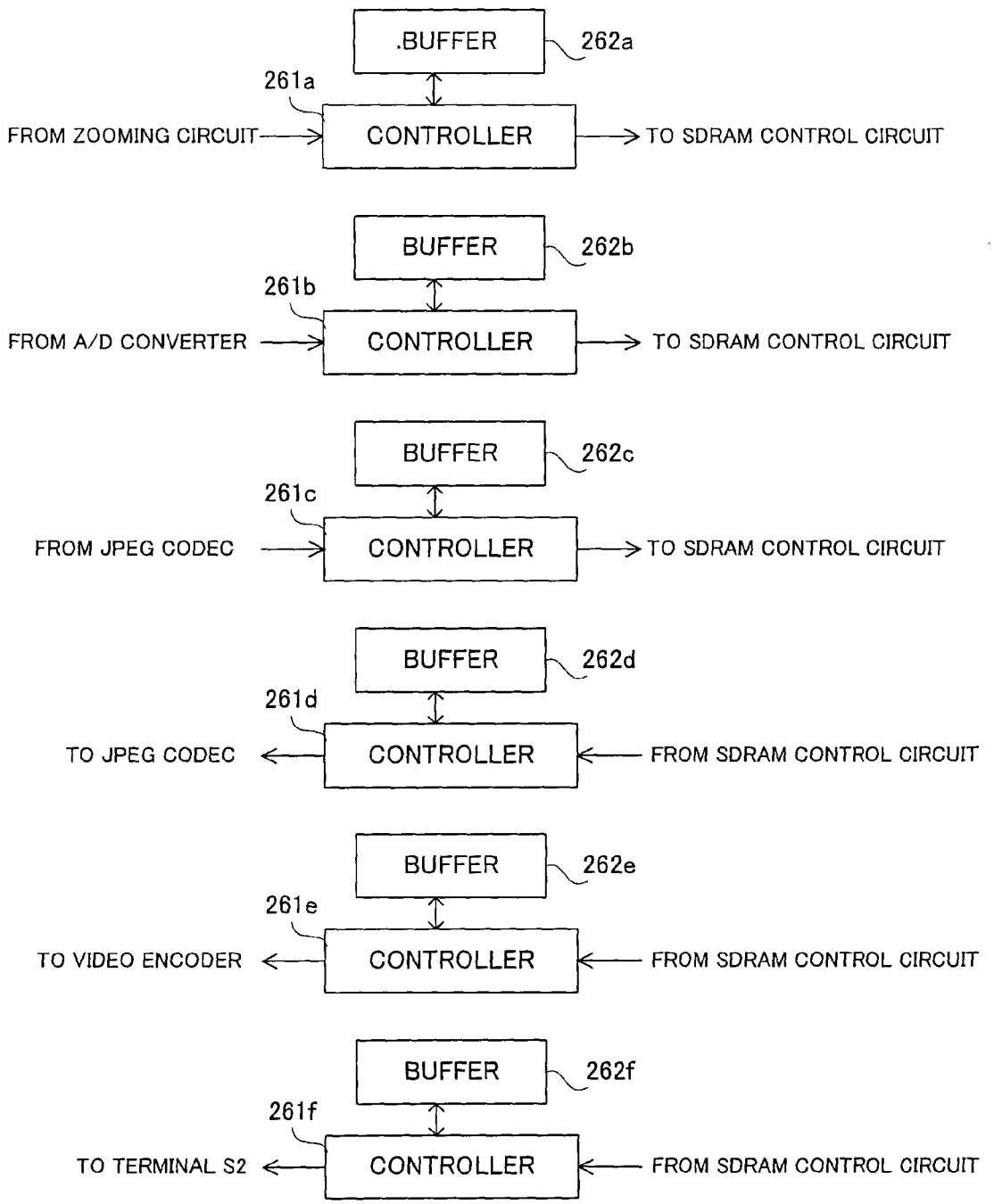
FIG. 4 is a block diagram showing one example of a buffer control circuit applicable to FIG. 1 embodiment.

Referring to FIG. 4, the buffer control circuit 26 has controllers 261a-261f to which buffers 262a-262f for temporarily storing data are respectively assigned. A data writing into the SDRAM 30 is performed by the controllers 261a-261c, and a data reading-out from the SDRAM 30 is performed by the controllers 261d-261f.

The low resolution YUV data output from the zooming circuit 24 shown in FIG. 1 is applied to an SDRAM control circuit 28 via the controller 261a and the buffer 262a. The SDRAM 30 is mapped as shown in FIG. 3, and the SDRAM control circuit 28 writes the applied low resolution YUV data into a display image area 30a.

The low resolution YUV data stored in the display image area 30a is read out by the SDRAM control circuit 28, and output to a video encoder 32 via the controller 261e and the buffer 262e. In the video encoder 32, the low resolution YUV data is converted into a composite image signal, and the converted composite image signal is applied to the LCD monitor 34. As a result, the through image is displayed on the monitor screen.

When the shutter button 42 is operated, the CPU 38 instructs the TG 16 to perform one exposure and one all-pixel-reading for recording the object image into a recording medium 40. The TG 16 applies the main exposure to the CCD imager 14, and reads out the electric charges generated thereby in the interlace scan manner. At this time, all the pixels are subject to be read-out as shown in FIG. 6(A). In an odd number field, the electric charges of the RG line are output as shown in FIG. 6(B), and in an even number field, the electric charges of the GB line are output as shown in FIG. 6(C).

One frame of the high resolution raw image signal thus output from the CCD imager 14 passes through the CDS/AGC circuit 18, and is converted into high resolution raw image data in the A/D converter 20. The converted high resolution raw image data is directly input into the buffer control circuit 26, and applied to the SDRAM control circuit 28 via the controller 261b and the buffer 262b. The high resolution raw image data is written into a raw image area 30b shown in FIG. 3 by the SDRAM control circuit 28.

It is noted that during a period between from the shutter button 42 is operated and until 1 frame of the high resolution raw image data is fetched into the raw image area 30b, the video encoder 32 is turned off, and a black image is displayed on the monitor 34.

The high resolution raw image data stored in the raw image area 30b is read out by the SDRAM control circuit 28. The raw image data in the odd number field, and the high resolution raw image data in the even number field are alternately read out by each one line, and thereby, interlace scan data is converted into progressive scan data. The converted high resolution raw image data is output to a terminal S2 shown in FIG. 1 via the controller 261f and the buffer 262f.

When the shutter button 42 is operated, the switch SW1 is connected to the terminal S2. The high resolution raw image data output from the controller 261f is applied to the signal processing circuit 22 via the switch SW1. The signal processing circuit 22 subjects the applied high resolution raw image data to a signal process corresponding to an image recording, and thereby, high resolution YUV data is generated. The generated high resolution YUV data is applied to the zooming circuit 24, and converted into display-use low resolution YUV data by the reduction zooming process.

The converted low resolution YUV data is applied to the SDRAM control circuit 28 via the controller 261a and the buffer 262a shown in FIG. 4, and written into the display image area 30a of the SDRAM 30 by the SDRAM control circuit 28. The low resolution YUV data stored in the display image area 30a is applied to the video encoder 32 by the same process as at a time of outputting the through image. As a result, a freeze image of the object is displayed on the monitor 34.

Upon completion of writing the low resolution YUV data corresponding to the freeze image into the display image area 30a, the high resolution raw image data stored in the raw image area 30b is once again read out by the SDRAM control circuit 28. At this time, too, the high resolution raw image data in the odd number field, and the high resolution raw image data in the even number field are alternately read out by each one line. The read high resolution raw image data is applied to the signal processing circuit 22 as described above, and converted into the high resolution YUV data.

A horizontal zooming magnification and a vertical zooming magnification of the zooming circuit 24 are initialized after the low resolution YUV data corresponding to the freeze image is obtained. Thus, the high resolution YUV data is output from the zooming circuit 24 without being applied to the zoom process.

The output high resolution YUV data is applied to the SDRAM control circuit 28 through the controller 261a and the buffer 262a shown in FIG. 4, and written into a JPEG work area 30c shown in FIG. 3 by the SDRAM control circuit 28. The high resolution YUV data stored in the JPEG work area 30c is read out by the SDRAM control circuit 28 later, and applied to a JPEG CODEC 36 via the controller 261d and the buffer 262d shown in FIG. 4. The JPEG CODEC 36 applies a JPEG compression to the applied high resolution YUV data, thereby generating JPEG data. The generated JPEG data is applied to the SDRAM control circuit 28 via the controller 261c and the buffer 262c shown in FIG. 4, and written into a compressed image area 30d shown in FIG. 3 by the SDRAM control circuit 28.

After the JPEG data is obtained in the compressed image area 30d, the CPU 38 accesses the SDRAM 30 through the SDRAM control circuit 28, and reads out the JPEG data from the compressed image area 30d. The CPU 38 further creates an image file including the read JPEG data, and records the created image file into the recording medium 40.

Figure 7:
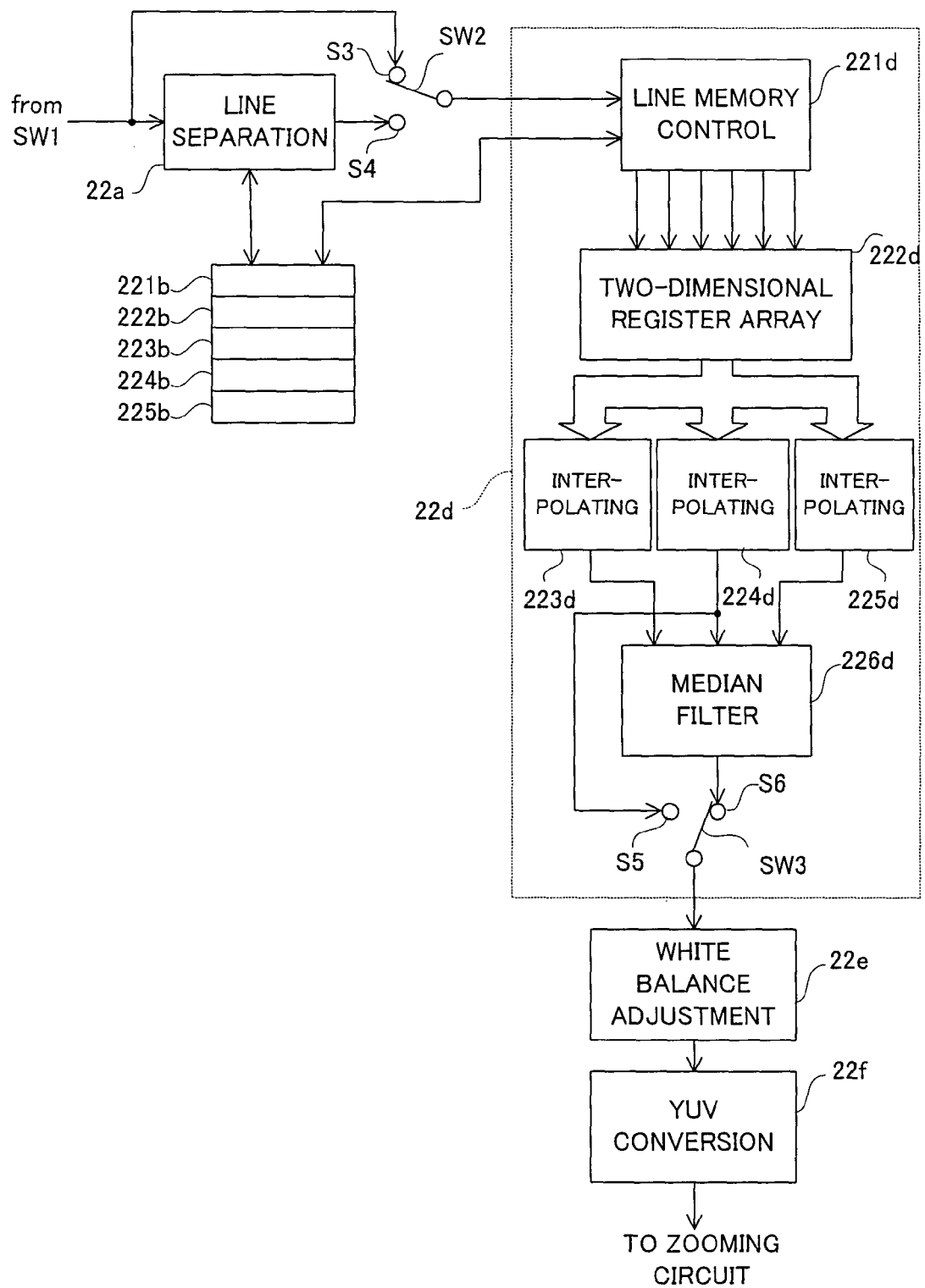
FIG. 7 is a block diagram showing one example of structure of a signal processing circuit applicable to FIG. 1 embodiment.

The signal processing circuit 22 is formed as shown in FIG. 7. When the low resolution raw image data is applied from the switch SW1 for outputting the through image, a switch SW2 is connected to a terminal S4, and a switch SW3 is connected to a terminal S5. Thereby, a line separation circuit 22a is rendered effective, and interpolating circuits 223d and 225d, and a median filter 226d included in the color separation circuit 22d are rendered ineffective. Furthermore, of the five line memories 221b-225b, the two line memories 221b and 222b are assigned to the line separation circuit 22a, and the other three line memories 223b-225b are assigned to the color separation circuit 22d.

Referring to FIG. 8(A), provided that the number of horizontal pixels and the number of vertical pixels of the CCD imager 14 are Hpx and Vpx, the number of horizontal pixels H1m and the number of vertical pixels V1m of the low resolution raw image signal output from the CCD imager 14 at a time of outputting the through image are Hpx and Vpx/6. In addition, in each line forming the low resolution raw image signal, the color information of the pixel signals changes in the order of R, G, G, B, R, G, G, B, . . . ,. Therefore, the color information of the pixel data input from the switch SW1, too, changes in the order of R, G, G, B, R, G, G, B, . . . ,.

The line separation circuit 22a separates the pixel data from the switch SW1 into two by two pixels, one of the separated image data is written into the line memory 221b, and the other separated image data is written into the line memory 222b. The color information of the pixel data written in the line memory 221b changes in the order of R, G, R, G, . . . , and the color information of the pixel data written in the line memory 222b changes in the order of G, B, G, B, . . . ,. The line separation circuit 22a reads out the pixel data in order from the line memories 221b and 222b, later. As a result, the low resolution raw image data having an arrangement of the pixel data converted as shown in FIG. 8 (B) is output from the line separation circuit 22a.

According to FIG. 8(B), the converted number of horizontal pixels H2m becomes ½ the number of horizontal pixels H1m yet to be converted, and the converted number of vertical pixels V2m becomes two times the number of vertical pixels V1m yet to be converted. Furthermore, the color information of the pixel data belongs to the odd number line changes in the order of R, G, R, G, . . . , and the color information of the pixel data belongs to the even number line changes in the order of G, B, G, B, . . . ,.

It is noted that each of the line memories 221b-225b has a capacity capable of storing the pixel data equal to the number of horizontal pixels H1. Thus, of the low resolution raw image data of H2m×V2m shown in FIG. 8(B), the pixel data worth two lines of the odd number-th is stored in the line memory 221b, and the pixel data worth two lines of the even number-th is stored in the line memory 222b.

The low resolution raw image data output from the line separation circuit 22a is applied to a line memory control circuit 221d included in the color separation circuit 22d via the switch SW2. The line memory control circuit 221d uses the line memories 223b-225b so as to simultaneously input low resolution raw image data worth four lines into a two-dimensional register array 222d. More specifically, of four lines to be noticed, the raw image data of 1st line-3rd line are written into the line memories 223b-225b, and the raw image data of 1st line-3rd line are input from the line memories 223b-225b to the two-dimensional register array 222d at a timing that the raw image data of 4th line is input into the two-dimensional register array 222d.

The two-dimensional register array 222d applies the raw image data thus input to the interpolating circuit 224d in a unit of horizontal four pixels×vertical four lines. The interpolating circuit 224d applies an interpolating process to the applied raw image data, and generates by each one line the interpolated image data formed of each pixel having all color information R, G, and B. The switch SW3 is connected to the terminal S5 so that the interpolated image data generated is output to a white balance adjustment circuit 22e without circulating the median filter 226d.

It is noted that 4 lines of the raw image data simultaneously input in the two-dimensional register array 222d is updated by each one line, and the raw image data of horizontal four pixels×vertical four lines applied to the interpolating circuit 224d is updated in a horizontal direction by each one pixel.

In the white balance adjustment circuit 22e, a white balance adjustment is applied to the interpolated image data input from the color separation circuit 22d, and in a succeeding YUV conversion circuit 22f, a YUV conversion is applied to the interpolated image data having the white balance adjusted. As a result, the low resolution YUV data having the number of horizontal pixels H3m, and the number of vertical pixels V3m as shown in FIG. 8(C) is output from the YUV conversion circuit 22f. The number of horizontal pixels H3m, and the number of vertical pixels V3m of the low resolution YUV data is approximately equal to the number of horizontal pixels H2m, and the number of vertical pixels V2m of the low resolution raw image data to which the line separation is applied.

When the high resolution raw image data is applied from the switch SW1 for the image recording, the switch SW2 is connected to a terminal S3, and the switch SW3 is connected to a terminal S6. Thereby, the line separation circuit 22a is invalidated, and the interpolating circuit 223d and 225d, and the median filter 226d are validated. In addition, all the five line memories 221b-225b are assigned to the line memory control circuit 221d.

Referring to FIG. 9(A), the number of horizontal pixels H1n and the number of vertical pixels V1n of the high resolution raw image data read out from the raw image area 30b of the SDRAM 30 at a time of the image recording is equal to the number of horizontal pixels Hpx and the number of vertical pixels Vpx of the CCD imager 14. Furthermore, when the high resolution raw image data is read out from the raw image area 30b, a scanning manner is changed from the interlace scanning manner to a progressive scanning manner so that the color information of the pixel data belongs to the odd number line changes in the order of R, G, R, G, . . . , and the color information of the pixel data belongs to the even number line changes in the order of G, B, G, B, . . . .

The line memory control circuit 221d uses the line memories 221b-225b so as to simultaneously input the high resolution raw image data worth six lines into the two-dimensional register array 222d. That is, of six lines to be noticed, the raw image data of 1st line-5th line are written into the line memories 221b-225b, and the raw image data of 1st line-5th line are input from the line memories 221b-225b to the two-dimensional register 222d at a timing that the raw image data of 6th line is input into the two-dimensional register array 221d.

Of the six lines of the raw image data simultaneously input, the two-dimensional register array 222 applies the raw image data of 1st line-4th line to the interpolating circuit 223d by each horizontal four pixels×vertical four lines, applies the raw image data of 2nd line-5th line to the interpolating circuit 224d by each horizontal four pixels×vertical four lines, and applies the raw image data of 3rd line-6th line to the interpolating circuit 225d by each horizontal four pixels×vertical four lines.

Each of the interpolating circuit 223d-225d creates the interpolated image data by the interpolating process by each one line. A total of three lines of the created interpolated image data is applied to the median filter 226d. In the median filter 226d, a median filter process is applied to the three lines of the interpolated image data simultaneously output, thereby one line of the interpolated image data having the noise removed is created. The created interpolated image data is output to the white balance adjustment circuit 22e via the switch SW3.

It is noted that at a time of the image recording, too, six lines of the raw image data simultaneously input in the two-dimensional register array 222d is updated by each one line, and the raw image data of horizontal four pixels×vertical four lines applied to the interpolating circuits 223d-225d is updated by each one pixel in a horizontal direction.

In the white balance adjustment circuit 22e, the white balance adjustment is applied to the interpolated image data input from the color separation circuit 22d, and in the YUV conversion circuit 22f, the YUV conversion is applied to the interpolated image data having the color balance adjusted. As a result, the high resolution YUV data having the number of horizontal pixels H2n, and the number of vertical pixels V2n is output from the YUV conversion circuit 22f as shown in FIG. 9(B). The number of horizontal pixels H2n and the number of vertical pixels V2n of the high resolution YUV data is approximately equal to the number of horizontal pixels H1n and the number of vertical pixels V1n of the high resolution raw image data input from the switch SW1.

As understood from the above descriptions, regarding the low resolution raw image data, the color information is distributed on the pixels of each line in the order of R, G, G, B. . . . ,. On the other hand, regarding the high resolution raw image data, the color information is distributed on the pixels of odd number line in the order of R, G, R, G, . . . , and the color information is distributed on the pixels of even number line in the order of G, B, G, B, . . . ,. That is, in the low resolution raw image data, all the color information are distributed in one (=N) line, and in the high resolution raw image data, all the color information are distributed in two (=L) lines.

When the interpolated image data is generated based on the low resolution raw image data, firstly, the line separation circuit 22a uses two (=L) line memories 221b and 222b of five (=K) line memories 221b-225b so as to convert the color distributing manner. As a result of a conversion, the color information is distributed on the pixels of odd number line in the order of R, G, R, G, . . . , and the color information is distributed on the pixels of the even number line in the order of G, B, G, B, . . . . The color separation toward such the low resolution raw image data is performed using three (=M) line memories 223b-225b. On the other hand, when the interpolated image data is generated based on the high resolution raw image data, no conversion of the color distribution is performed. Thus, the color separation is executed by using all line memories 221b-225b.

That is, when the signal process is applied to the low resolution raw image data, one portion of the line memories are used for converting the color distributing manner, and the remaining line memories are used for the color separation. On the other hand, when the signal process is applied to the low resolution raw image data, all the line memories are used for the color separation. The number of the line memories assigned to the color distribution differs depending on the low resolution raw image data or the high resolution raw image data so that a difference in capability of the color separation occurs, however, a color separating process toward the image signals having the different color distributing manners becomes possible.

It is noted that in this embodiment, a color filter of a primary Bayer pattern is used. However, instead thereof, a complementary color filter in which color elements of Ye, Cy, Mg, and G are arranged in a mosaic manner may be used.

In addition, in this embodiment, the driving system of the image sensor differs between a time of outputting the through image and that of outputting the image recording, and therefore, the distributing manner of the color information differs depending on the low resolution image data or the high resolution image data. However, in a case of mounting the two image sensors having different driving systems with each other into two digital cameras that execute a common signal process, respectively, a difference in a color distributing manner occurs in the cameras. According to the present invention, even in such the case, the signal process is properly executed. That is, the signal processing circuit (ASIC) realized by the present invention is applicable to a plurality of image sensors different in type.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image signal processing apparatus provided with K of line memories, and applying a signal process to a first image signal having a plurality of colors of color information in which one color is assigned to one pixel in a first manner, and a second image signal having the plurality of colors of color information in which one color is assigned to one pixel in a second manner, comprising:
   a converter for converting a color distribution of the first image signal from the first manner to the second manner using L of line memories forming said K of line memories;
   a first color separator for applying another color separation to the first image signal having the color distribution converted by said converter using M (=K−L) of line memories forming said K of line memories; and
   a second color separator for applying a color separation to the second image signal using said K of line memories.

2. An image signal processing apparatus according to claim 1, wherein the first manner is a manner in which the plurality of colors of color information are distributed across N (≦L) lines, and the second manner is a manner in which the plurality of colors of color information are distributed across the L lines.

3. An image signal processing apparatus according to claim 1, wherein said first color separator includes a first interpolator for generating by each one line an interpolated image signal formed of each pixel having the plurality of colors of color information based on the first image signal read out from said L of line memories.

4. An image signal processing apparatus according to claim 1, wherein said second color separator includes a second interpolator for simultaneously generating a plurality of lines of an interpolated image signal formed of each pixel having the plurality of colors of color information based on the second image signal read out from said K of line memories, and a noise remover for generating one line of the interpolated image signal having a noise removed based on the plurality of lines of interpolated image signal generated by said second interpolator.

5. An image signal processing apparatus according to claim 1, wherein the first image signal has a resolution lower than that of the second image signal.

6. An image signal processing apparatus according to claim 5, wherein said first image signal is a moving image signal, and said second image signal is a still image signal.

7. A signal processing method of an image signal processing apparatus provided with K of line memories, and applying a signal process to a first image signal having a plurality of colors of color information in which one color is assigned to one pixel in a first manner, and a second image signal having the plurality of colors of color information in which one color is assigned to one pixel in a second manner, comprising steps of:
   (a) converting a color distribution of the first image signal from the first manner to the second manner using L of line memories forming said K of line memories;
   (b) applying a color separation to the first image signal having the color distribution converted by said step (a) using M (=K−L) of line memories forming said K of line memories; and
   (c) applying another color separation to the second image signal using said K of line memories.

8. A signal processing method of an image signal processing apparatus provided with a plurality of line memories, and applying a signal process to a first image signal having a plurality of colors of color information in which one color is assigned to one pixel in a first manner, and a second image signal having the plurality of colors of color information in which one color is assigned to one pixel in a second manner, comprising steps of:
   (a) converting a color distribution of the first image signal from the first manner to the second manner using a portion of said plurality of line memories;
   (b) applying a color separation to the first image signal having the color distribution converted by said step (a) using another portion of said plurality of line memories; and
   (c) applying another color separation to the second image signal using said plurality of line memories.

* * * * *